United States Patent
Zou et al.

(10) Patent No.: US 12,447,186 B2
(45) Date of Patent: Oct. 21, 2025

(54) TRADITIONAL CHINESE MEDICINE COMPOUND COMPOSITION WITH ANTI-ANXIETY EFFECT AND PREPARATION METHOD AND APPLICATIONS THEREOF

(71) Applicants: Chenland Nutritionals Inc., Pomona, CA (US); Qingdao Chenland Pharmaceutical Technology Development Co., Ltd., Qingdao (CN)

(72) Inventors: Shengcan Zou, Qingdao (CN); Jiancheng Zong, Qingdao (CN); Wenyu Li, Qingdao (CN); Xin Li, Qingdao (CN); Lei Zong, Qingdao (CN); Zengliang Zhang, Qingdao (CN); Shanglong Wang, Qingdao (CN)

(73) Assignees: Qingdao Chenland Health Industry Group Co., Ltd., Qingdao (CN); Chenland Nutritionals, Inc.

( * ) Notice: Subject to any disclaimer, the term of this patent is extended or adjusted under 35 U.S.C. 154(b) by 1093 days.

(21) Appl. No.: 17/315,224

(22) Filed: May 7, 2021

(65) Prior Publication Data
US 2022/0175865 A1    Jun. 9, 2022

Related U.S. Application Data

(63) Continuation of application No. PCT/CN2020/136657, filed on Dec. 16, 2020.

(30) Foreign Application Priority Data

Dec. 7, 2020 (CN) .......................... 202011437190.5

(51) Int. Cl.
| | |
|---|---|
| *A61K 36/744* | (2006.01) |
| *A61K 9/00* | (2006.01) |
| *A61K 36/48* | (2006.01) |
| *A61K 36/65* | (2006.01) |
| *A61P 25/22* | (2006.01) |

(52) U.S. Cl.
CPC .......... *A61K 36/744* (2013.01); *A61K 9/0056* (2013.01); *A61K 36/48* (2013.01); *A61K 36/65* (2013.01); *A61P 25/22* (2018.01); *A61K 2236/331* (2013.01); *A61K 2236/333* (2013.01); *A61K 2236/39* (2013.01); *A61K 2236/51* (2013.01); *A61K 2236/53* (2013.01)

(58) Field of Classification Search
None
See application file for complete search history.

(56) References Cited

PUBLICATIONS

Qu, Y. et al., Study on the effect of Jia-Wei-Xiao-Yao-San decoction on patients with functional dyspepsia, Jul. 16, 2009, Phytotherapy Research, vol. 24, 245-248 (Year: 2009).*
Xiong, W-C et al., Network pharmacology-based research of active components of albiziae flos and mechanisms of its antidepressant effect, Mar. 13, 2020, Current Medical Science, vol. 40, 123-129 (Year: 2020).*

* cited by examiner

*Primary Examiner* — Craig D Ricci
*Assistant Examiner* — Paul Hoerner

(57) ABSTRACT

A traditional Chinese medicine compound composition with anti-anxiety effect and its preparation method and application are disclosed. The traditional Chinese medicine compound composition with anti-anxiety effect is prepared by compounding the *Paeoniae Radix Alba* extract, the *Gardeniae Fructus* extract, the *Albiziae Flos* extract and the *Moutan Cortex* extract. The traditional Chinese medicine compound composition has no toxic side effects and has remarkable treatment effect, and can be used as a dietary supplement or a health-care food ingredient to prevent and treat anxiety disorder, and promote mental health. It can be seen that the traditional Chinese medicine compound composition is suitable for promotion and application.

8 Claims, 3 Drawing Sheets

TRADITIONAL CHINESE MEDICINE COMPOUND COMPOSITION WITH ANTI-ANXIETY EFFECT AND PREPARATION METHOD AND APPLICATIONS THEREOF

TECHNICAL FIELD

The present disclosure relates to the technical field of natural medicines, in particular to a traditional Chinese medicine compound composition and its preparation method and application, and more specifically, to a traditional Chinese medicine compound composition with anti-anxiety effect and its preparation method and application.

BACKGROUND

Anxiety disorder, also known as anxiety neurosis, is a kind of mental disease with anxiety as the main emotion. Neurotic disorders characterized by generalized and persistent anxiety or recurrent panic disorder can cause autonomic nervous symptoms, such as dizziness, chest distress, palpitation, shortness of breath, dry mouth, frequent urination, urgency of urination, sweating and tremor, and motor tension. At present, there are six major anxiety disorders, including generalized anxiety disorder, social anxiety disorder, panic disorder, post-traumatic stress disorder, obsession and specific phobia. With the progress of society, work and study pressure of people is increasing, and there are more and more patients with anxiety disorder. Anxiety disorder has become one of the hot research fields in neuroscience.

At present, western medicine is the main drug for the treatment of anxiety disorder, which often leads to adverse reactions such as muscle relaxation, sedation, ataxia, amnesia, drug dependence, memory dysfunction and so on. There are three kinds of drugs for the treatment of anxiety disorder in clinic: uptake inhibitor, benzodiazepine and estazolam. Although these drugs have anti-anxiety effect, the action time is short, and long-term use is addictive and not conducive to the rehabilitation of patients.

Therefore, it is an urgent problem for those skilled in the art to develop a traditional Chinese medicine compound composition with no toxic side effects, significant effect for the prevention or treatment of anxiety disorder and the promotion of mental health.

SUMMARY

In view of the above, an object of the present disclosure is to provide a traditional Chinese medicine compound composition with anti-anxiety effect, where the traditional Chinese medicine compound composition has no toxic side effects and has remarkable treatment effect, and can be used as a raw material of dietary supplement or a health-care food to prevent and treat anxiety disorder, and promote mental health.

Technical solutions of the present disclosure are specifically described as follows.

Depression is a syndrome characterized by a significant and lasting depression, which is mainly manifested as depression mood, decreased speech, mental retardation, motor retardation, self accusation, and even attempted suicide. Although depression and anxiety disorder are two different mental diseases, it is common that they coexist in the same patient. Depression patients with anxiety symptoms have more severe condition, more complex clinical symptoms and lower cure rate. Therefore, according to the symptoms, treatment in turn is more effective, and the cure rate is higher. Therefore, on the basis of the existing patent of antidepressant compound Chinese medicine, a compound traditional Chinese medicine with anti-anxiety effect is developed to relieve anxiety, insomnia and other diseases.

In a first aspect, the disclosure provides a traditional Chinese medicine compound composition with anti-anxiety effect, including:

50%-55% by weight of *Paeoniae Radix Alba* extract;
20%-40% by weight of *Gardeniae Fructus* extract;
15%-30% by weight of *Albiziae Flos* extract; and
1%-5% by weight of *Moutan Cortex* extract.

Preferably, the traditional Chinese medicine compound composition includes:

52.1% by weight of *Paeoniae Radix Alba* extract;
27.0% by weight of *Gardeniae Fructus* extract;
18.7% by weight of *Albiziae Flos* extract; and
2.2% by weight of *Moutan Cortex* extract.

Further preferably, the above extracts are separately extracted from the corresponding traditional Chinese medicine material, and the traditional Chinese medicine composition is prepared by extracting the above extracts respectively from *Paeoniae Radix Alba*, *Gardeniae Fructus*, *Albiziae Flos* and *Moutan Cortex* and compounding.

It should be noted that, the raw materials of the extracts used herein are scientifically selected (from anti-anxiety related prescriptions) and combined organically according to the compatibility of traditional Chinese medicines rather than simple superimposing of the effect of each Chinese medicine. Effects of the abovementioned traditional Chinese medicine materials are listed as follows:

*Paeoniae Radix Alba*

Functions: nourishing blood and regulating menstruation, collecting Yin and stopping sweating, softening liver and relieving pain, and stabilizing liver Yang;

Indications: blood deficiency, dysmenorrhea, spontaneous perspiration, night sweating, hypochondriac pain, abdominal pain, limb contracture pain, headache and vertigo.

*Gardeniae Fructus*

Functions: purging fire and removing annoyance, clearing heat, removing dampness, cooling blood and detoxifying, external application of detumescence and pain relief;

Indications: febrile dysphoria, damp-heat jaundice, astringent pain due to gonorrhea, heat blood, swelling and pain in eyes, sores and ulcers, and external treatment of contuse and pain.

*Albiziae Flos*

Functions: relieving depression and calming nerves;
Indications: restlessness, melancholy and insomnia.

*Moutan Cortex*

Functions: clearing heat and cooling blood, promoting blood circulation and removing blood stasis;

Indications: heat blood, warm toxic spots, hematemesis, night heat and early cool, no sweat and bone steaming, amenorrhea, dysmenorrhea, falling pain, carbuncle swelling and sore poison.

This prescription is mainly composed of *Radix Paeoniae Alba*, which can nourish blood and regulate menstruation, collect Yin and stop perspiration, soften liver and relieve pain, and stabilize liver Yang. Although both *Gardeniae Fructus* and *Moutan Cortex* have the effect of cooling blood and detoxifying, *Gardeniae Fructus* lays particular emphasis on purging fire and removing annoyance, clearing heat and removing dampness, while *Moutan Cortex* has the effect of activating blood circulation and removing stasis, reducing deficiency heat and so on. In addition, *Albiziae Flos* has the effect of relieving depression and calming nerves. The four traditional Chinese medicines complement each other and work together to treat anxiety and insomnia.

In addition, though the common dosage of each traditional Chinese medicine is known in the prior art, the prescription of the disclosure is made for the target disease by organically combining the above medicines, and its medicinal effect is not equivalent to the simple superposition of the effects of these medicines at a commonly-used amount. Actually, it cannot determine the amount of each medicine in the prescription according to their individual commonly-used amount, and the compounding ratio depends on many factors such as the characteristics of the medicinal materials and the compatibility of monarch drugs, ministerial drugs, adjuvant drugs and envoy drugs, and cannot be determined by experimental means such as comparison method and orthogonal test.

In a second aspect, the disclosure provides a preparation method of the traditional Chinese medicine compound composition, including: subjecting *Paeoniae Radix Alba*, *Gardeniae Fructus*, *Albiziae Flos* and *Moutan Cortex* to extraction, purification by macroporous resin, concentration and drying to produce *Paeoniae Radix Alba* extract, *Gardeniae Fructus* extract, *Albiziae Flos* extract and *Moutan Cortex* extract, respectively; and mixing the *Paeoniae Radix Alba* extract, the *Gardeniae Fructus* extract, the *Albiziae Flos* extract and the *Moutan Cortex* extract uniformly to produce the traditional Chinese medicine compound composition;

where the preparation method specifically includes:

(1) subjecting *Paeoniae Radix Alba*, *Gardeniae Fructus*, *Albiziae Flos* and *Moutan Cortex* to extraction respectively with an ethanol solution/purified water under refluxing and filtration; subjecting a residue to extraction with a solvent and filtration several times; and combining filtrates to obtain a crude *Paeoniae Radix Alba* extract, a crude *Gardeniae Fructus* extract, a crude *Albiziae Flos* extract and a crude *Moutan Cortex* extract, respectively;

(2) subjecting the crude *Paeoniae Radix Alba* extract, the crude *Gardeniae Fructus* extract, the crude *Albiziae Flos* extract and the crude *Moutan Cortex* extract to purification, concentration, drying and sieving to produce the *Paeoniae Radix Alba* extract, the *Gardeniae Fructus* extract, the *Albiziae Flos* extract and the *Moutan Cortex* extract; and (3) mixing the *Paeoniae Radix Alba* extract, the *Gardeniae Fructus* extract, the *Albiziae Flos* extract and the *Moutan Cortex* extract uniformly in a weight ratio of (50-55):(20-40):(15-30):(1-5) to produce the traditional Chinese medicine compound composition.

Preferably, in step (1), a volume ratio of *Paeoniae Radix Alba* to the ethanol solution/purified water is 1:(5-20); a volume ratio of *Gardeniae Fructus* to the ethanol solution/purified water is 1:(5-20); a volume ratio of *Albiziae Flos* to the ethanol solution/purified water is 1:(5-20); a volume ratio of *Moutan Cortex* to the ethanol solution/purified water is 1:(5-20); and the extraction of *Paeoniae Radix Alba*, *Gardeniae Fructus*, *Albiziae Flos* and *Moutan Cortex* is performed 1-3 times each for 1-3 h, respectively.

Further, a volume ratio of the solvent to the residue is (6-8):1; and the extraction of the residue is performed under refluxing 0-3 times each for 1-2 h.

It should be noted that, the solvent is deionized water or an ethanol solution.

Preferably, in step (2), the drying is performed at 50-100° C.; and the sieving is performed using a sieve of 60-80 mesh.

Specifically, the preparation method of the traditional Chinese medicine compound composition includes the following steps:

(1) subjecting *Paeoniae Radix Alba* to extraction with a 60%-80% ethanol solution in a volume ratio of 1:8 under refluxing for 2 h and filtration to obtain a residue; subjecting the residue to extraction with deionized water in a volume ratio of 1:6 under refluxing 2 times each for 1 h; combining extracting solutions followed by concentration to thick paste; and drying the concentrated product at 50-80° C. under decompression followed by crushing and sieving with a sieve of 80 mesh to produce the *Paeoniae Radix Alba* extract;

(2) crushing *Gardeniae Fructus* to produce *Gardeniae Fructus* coarse powder; subjecting the *Gardeniae Fructus* coarse powder to extraction with a 60-80% ethanol solution 3 times respectively in a volume ratio of 1:6, 1:5 and 1:4 under refluxing each for 2 h and filtration; combining filtrates followed by purification and concentration; and drying the concentrated product at 50-80° C. under decompression followed by crushing and sieving with a sieve of 80 mesh to produce the *Gardeniae Fructus* extract;

(3) crushing *Albiziae Flos* to produce *Albiziae Flos* coarse powder; subjecting the *Albiziae Flos* coarse powder to extraction with a 60-75% ethanol solution 2 times in a volume ratio of 1:8 under refluxing each for 2 h and filtration; concentrating filtrates and drying the product at 50-75° C. under decompression followed by sieving with a sieve of 80 mesh to produce the *Albiziae Flos* extract;

(4) crushing *Moutan Cortex* to produce *Moutan Cortex* coarse powder; adding 14 times of purified water to the *Moutan Cortex* coarse powder and placing *Moutan Cortex* coarse powder solution for standing for 24 hours; heating and recovering 9 times of distillate, refrigerating the distillate for 24 hours followed by crystallization and filtration, and drying the crystal at low temperature to obtain the *Moutan Cortex* extract;

(5) mixing the *Paeoniae Radix Alba* extract, the *Gardeniae Fructus* extract and the *Albiziae Flos* extract and the *Moutan Cortex* extract uniformly according to the above weight ratio to produce the traditional Chinese medicine compound composition.

In a third aspect, the disclosure further provides an application of the traditional Chinese medicine compound composition in preparation of health-care food.

Further, the traditional Chinese medicine compound composition is used as a raw material of dietary supplement or health-care food to prevent and treat anxiety disorder and promote mental health, and the traditional Chinese medicine compound composition is in a form of a capsule, a granule or a tablet.

According to the above technical scheme, compared with the prior art, the disclosure provides a traditional Chinese medicine compound composition with anti-anxiety effect and its preparation method and application, and has the following beneficial effects.

1. The disclosure follows the traditional Chinese medicine compatibility theory, innovates the combination of *Paeoniae Radix Alba*, *Gardeniae Fructus*, *Albiziae Flos* and *Moutan Cortex*, and finally designs a traditional Chinese medicine compound composition with the effect of treating anxiety disorder and improving sleep disorder.

2. The disclosure adopts the preparation process of compound after single extraction of medicinal materials to determine the main active substances. Compared with the traditional Chinese medicine extraction method, the quality of the extract is more stable and the product controllability is higher.

3. The traditional Chinese medicine compound composition disclosed and protected by the disclosure verifies its efficacy through animal tests and molecular mechanism experiments, and its good anti-anxiety effect is determined.

4. The traditional Chinese medicine compound composition protected by the disclosure has no toxic side effects and is easy to be absorbed, and is used for the treatment of anxiety, insomnia, etc., and the traditional Chinese medicine compound composition can be used as a raw material of dietary supplement or health-care food for the prevention or treatment of anxiety disorder and the promotion of mental health. It can be seen that the traditional Chinese medicine compound composition is suitable for promotion and application.

BRIEF DESCRIPTION OF THE DRAWINGS

In order to explain the embodiments of the present disclosure, the following drawings that need to be used in the description of the embodiments will be briefly introduced. Obviously, the drawings in the following description are only embodiments of the present disclosure. For those of ordinary skill in the art, other drawings can be obtained based on the drawings disclosed without creative work.

DETAILED DESCRIPTION OF EMBODIMENTS

Figure 1:
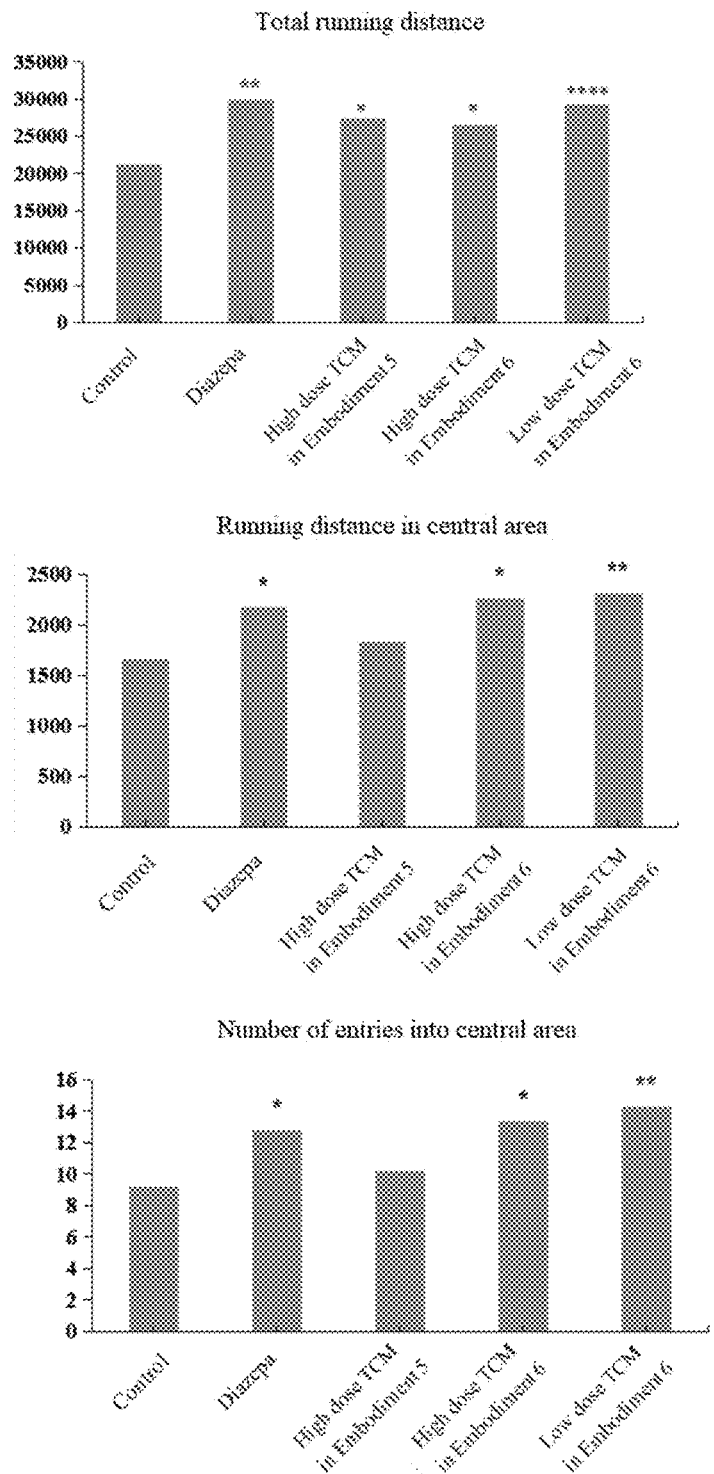
FIG. 1 shows the effect of the drug to be tested on the open field behavior of mice.
Figure 2:
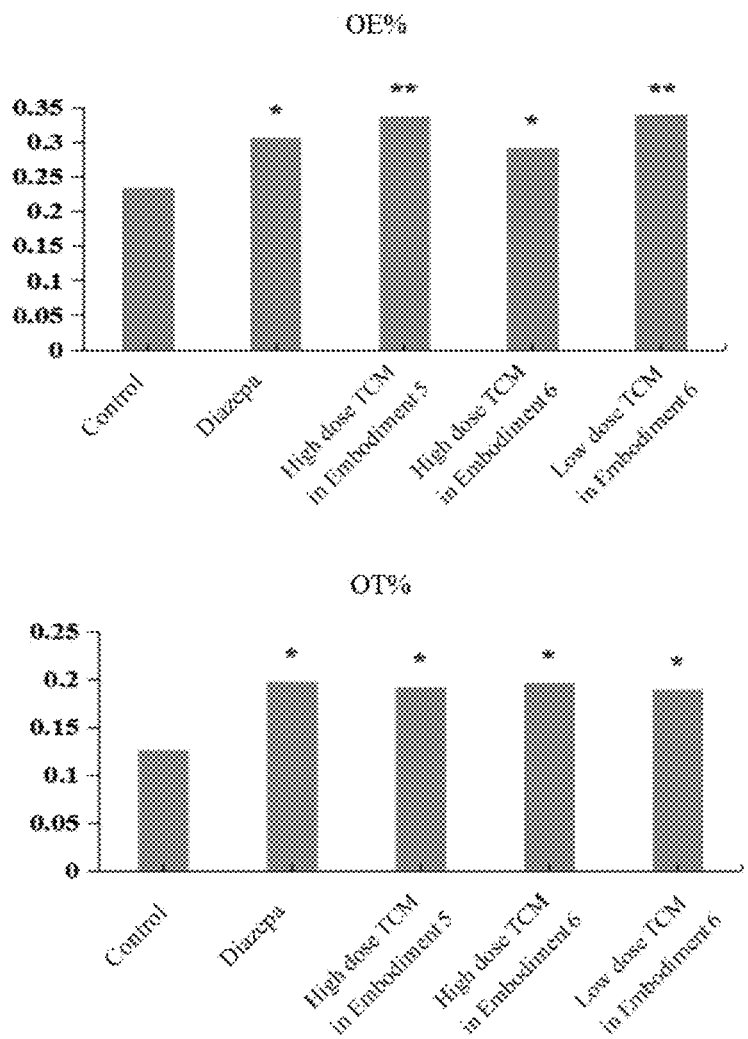
FIG. 2 shows the effect of the drug to be tested on EPM behavior of mice.
Figure 3:
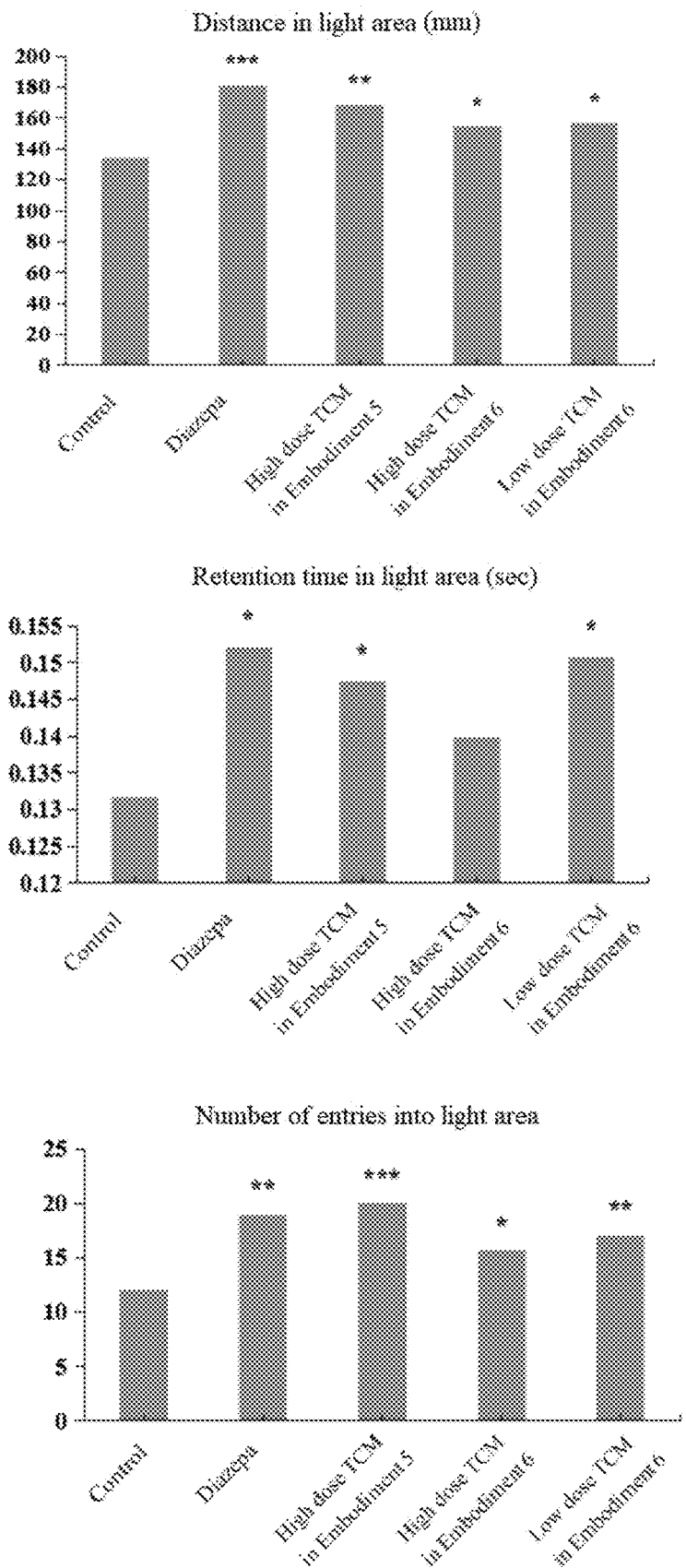
FIG. 3 shows the effect of the drug to be tested on the light-dark box behavior of mice.

Technical solutions of the present disclosure will be clearly and completely described below with reference to the embodiments. Obviously, described below are merely some embodiments of the disclosure, which are not intended to limit the disclosure. Other embodiments made by those skilled in the art without sparing any creative effort should fall within the scope of the disclosure.

The embodiments of the disclosure provide a traditional Chinese medicine compound composition with no toxic side effects, easy absorption and remarkable effect. The traditional Chinese medicine compound composition has anti-anxiety effect, and can be used as a dietary supplement or a health-care food raw material for the prevention or treatment of Anxiety disorder, and thus it is suitable for commercial promotion.

The disclosure will be further described below with reference to the embodiments. It should be understood that these embodiments are merely illustrative of the disclosure, and are not intended to limit the disclosure. Any improvement and modification made by those skilled in the art without departing from the spirit of the disclosure should still fall within the scope of the disclosure.

The technical scheme disclosed by the disclosure will be further described in combination with specific embodiments.

Embodiment 1

A traditional Chinese medicine compound composition with anti-anxiety effect included the following parts by weight: 120 parts of *Paeoniae Radix Alba*, 60 parts of *Gardeniae Fructus*, 100 parts of *Albiziae Flos* and 100 parts of *Moutan Cortex*.

The preparation method of the above traditional Chinese medicine compound composition included the following steps:

(1) subjecting *Paeoniae Radix Alba* to extraction with a 75% ethanol solution in a volume ratio of 1:8 under refluxing for 2 h and filtration to obtain a residue; subjecting the residue to extraction with deionized water in a volume ratio of 1:6 under refluxing 2 times each for 1 h; combining extracting solutions followed by concentration to thick paste; and drying the concentrated product at 60° C. under decompression followed by crushing and sieving with a sieve of 80 mesh to produce the *Paeoniae Radix Alba* extract;

(2) crushing *Gardeniae Fructus* to produce *Gardeniae Fructus* coarse powder; subjecting the *Gardeniae Fructus* coarse powder to extraction with an 80% ethanol solution 3 times respectively in a volume ratio of 1:6, 1:5 and 1:4 under refluxing each for 2 h and filtration; combining filtrates followed by purification and concentration; and drying the concentrated product at 60° C. under decompression followed by crushing and sieving with a sieve of 80 mesh to produce the *Gardeniae Fructus* extract;

(3) crushing *Albiziae Flos* to produce *Albiziae Flos* coarse powder; subjecting the *Albiziae Flos* coarse powder to extraction with a 60% ethanol solution 2 times in a volume ratio of 1:8 under refluxing each for 2 h and filtration; concentrating filtrates and drying the product at 60° C. under decompression followed by sieving with a sieve of 80 mesh to produce the *Albiziae Flos* extract;

(4) crushing *Moutan Cortex* to produce *Moutan Cortex* coarse powder; adding 14 times of purified water to the *Moutan Cortex* coarse powder and placing *Moutan Cortex* coarse powder solution for standing for 24 hours; heating and recovering 9 times of distillate, refrigerating the distillate for 24 hours followed by crystallization and filtration, and drying the crystal at low temperature to obtain the *Moutan Cortex* extract;

(5) mixing the *Paeoniae Radix Alba* extract, the *Gardeniae Fructus* extract and the *Albiziae Flos* extract and the *Moutan Cortex* extract uniformly according to the weight ratio of 52%, 27%, 19% and 2% to produce the traditional Chinese medicine compound composition with anti-anxiety effect.

Embodiment 2

A traditional Chinese medicine compound composition with anti-anxiety effect included the following parts by weight: 120 parts of *Paeoniae Radix Alba*, 60 parts of *Gardeniae Fructus*, 100 parts of *Albiziae Flos* and 100 parts of *Moutan Cortex*.

The preparation method of the above traditional Chinese medicine compound composition included the following steps:

(1) subjecting *Paeoniae Radix Alba* to extraction with a 70% ethanol solution in a volume ratio of 1:8 under refluxing for 2 h and filtration to obtain a residue; subjecting the residue to extraction with deionized water in a volume ratio of 1:6 under refluxing 2 times each for 1 h; combining extracting solutions followed by concentration to thick paste; and drying the concentrated product at 60° C. under decompression followed by crushing and sieving with a sieve of 80 mesh to produce the *Paeoniae Radix Alba* extract;

(2) crushing *Gardeniae Fructus* to produce *Gardeniae Fructus* coarse powder; subjecting the *Gardeniae Fructus* coarse powder to extraction with an 70% ethanol solution 3 times respectively in a volume ratio of 1:6, 1:5 and 1:4 under refluxing each for 2 h and filtration; combining filtrates followed by purification and concentration; and drying the concentrated product at 60° C. under decompression followed by sieving with a sieve of 80 mesh to produce the *Gardeniae Fructus* extract;

(3) crushing *Albiziae Flos* to produce *Albiziae Flos* coarse powder; subjecting the *Albiziae Flos* coarse powder to extraction with a 70% ethanol solution 2 times in a volume ratio of 1:8 under refluxing each for 2 h and filtration; concentrating filtrates and drying the product at 60° C. under decompression followed by sieving with a sieve of 80 mesh to produce the *Albiziae Flos* extract;

(4) crushing *Moutan Cortex* to produce *Moutan Cortex* coarse powder; adding 14 times of purified water to the *Moutan Cortex* coarse powder and placing *Moutan Cortex* coarse powder solution for standing for 24 hours; heating and recovering 9 times of distillate, refrigerating the distillate for 24 hours followed by crystallization and filtration, and drying the crystal at low temperature to obtain the *Moutan Cortex* extract;

(5) sieving with a sieve of 80 mesh and mixing the *Paeoniae Radix Alba* extract, the *Gardeniae Fructus* extract and the *Albiziae Flos* extract and the *Moutan Cortex* extract uniformly according to the weight ratio of 52.1%, 27.0%, 18.7% and 2.2% to produce the traditional Chinese medicine compound composition with anti-anxiety effect.

Embodiment 3

A traditional Chinese medicine compound composition with anti-anxiety effect included the following parts by weight: 120 parts of *Paeoniae Radix Alba*, 60 parts of *Gardeniae Fructus*, 100 parts of *Albiziae Flos* and 100 parts of *Moutan Cortex*.

The preparation method of the above traditional Chinese medicine compound composition included the following steps:

(1) subjecting *Paeoniae Radix Alba* to extraction with a 65% ethanol solution in a volume ratio of 1:8 under refluxing for 2 h and filtration to obtain a residue; subjecting the residue to extraction with deionized water in a volume ratio of 1:6 under refluxing 2 times each for 1 h; combining extracting solutions followed by concentration to thick paste; and drying the concentrated product at 60° C. under decompression followed by crushing and sieving with a sieve of 80 mesh to produce the *Paeoniae Radix Alba* extract;

(2) crushing *Gardeniae Fructus* to produce *Gardeniae Fructus* coarse powder; subjecting the *Gardeniae Fructus* coarse powder to extraction with a 70% ethanol solution 3 times respectively in a volume ratio of 1:6, 1:5 and 1:4 under refluxing each for 2 h and filtration; combining filtrates followed by purification and concentration; and drying the concentrated product at 60° C. under decompression followed by sieving with a sieve of 80 mesh to produce the *Gardeniae Fructus* extract;

(3) crushing *Albiziae Flos* to produce *Albiziae Flos* coarse powder; subjecting the *Albiziae Flos* coarse powder to extraction with a 75% ethanol solution 2 times in a volume ratio of 1:8 under refluxing each for 2 h and filtration; concentrating filtrates and drying the product at 60° C. under decompression followed by sieving with a sieve of 80 mesh to produce the *Albiziae Flos* extract;

(4) crushing *Moutan Cortex* to produce *Moutan Cortex* coarse powder; adding 14 times of purified water to the *Moutan Cortex* coarse powder and placing *Moutan Cortex* coarse powder solution for standing for 24 hours; heating and recovering 9 times of distillate, refrigerating the distillate for 24 hours followed by crystallization and filtration, and drying the crystal at low temperature to obtain the *Moutan Cortex* extract;

(5) sieving with a sieve of 80 mesh and mixing the *Paeoniae Radix Alba* extract, the *Gardeniae Fructus* extract and the *Albiziae Flos* extract and the *Moutan Cortex* extract uniformly according to the weight ratio of 55%, 22%, 18% and 5% to produce the traditional Chinese medicine compound composition with anti-anxiety effect.

Embodiment 4

A traditional Chinese medicine compound composition with anti-anxiety effect included the following parts by weight: 120 parts of *Paeoniae Radix Alba*, 60 parts of *Gardeniae Fructus*, 100 parts of *Albiziae Flos* and 100 parts of *Moutan Cortex*.

The preparation method of the above traditional Chinese medicine compound composition included the following steps:

(1) subjecting *Paeoniae Radix Alba* to extraction with a 50% ethanol solution in a volume ratio of 1:8 under refluxing for 2 h and filtration to obtain a residue; subjecting the residue to extraction with deionized water in a volume ratio of 1:6 under refluxing 2 times each for 1 h; combining extracting solutions followed by concentration to thick paste; and drying the concentrated product at 60° C. under decompression followed by crushing and sieving with a sieve of 80 mesh to produce the *Paeoniae Radix Alba* extract;

(2) crushing *Gardeniae Fructus* to produce *Gardeniae Fructus* coarse powder; subjecting the *Gardeniae Fructus* coarse powder to extraction with an 80% ethanol solution 3 times respectively in a volume ratio of 1:6, 1:5 and 1:4 under refluxing each for 2 h and filtration; combining filtrates followed by purification and concentration; and drying the concentrated product at 60° C. under decompression followed by sieving with a sieve of 80 mesh to produce the *Gardeniae Fructus* extract;

(3) crushing *Albiziae Flos* to produce *Albiziae Flos* coarse powder; subjecting the *Albiziae Flos* coarse powder to extraction with a 60% ethanol solution 2 times in a volume ratio of 1:8 under refluxing each for 2 h and filtration; concentrating filtrates and drying the product at 60° C. under decompression followed by sieving with a sieve of 80 mesh to produce the *Albiziae Flos* extract;

(4) crushing *Moutan Cortex* to produce *Moutan Cortex* coarse powder; adding 14 times of purified water to the *Moutan Cortex* coarse powder and placing *Moutan Cortex* coarse powder solution for standing for 24 hours; heating and recovering 9 times of distillate, refrigerating the distillate for 24 hours followed by crystallization and filtration, and drying the crystal at low temperature to obtain the *Moutan Cortex* extract;

(5) sieving with a sieve of 80 mesh and mixing the *Paeoniae Radix Alba* extract, the *Gardeniae Fructus* extract and the *Albiziae Flos* extract and the *Moutan Cortex* extract uniformly according to the weight ratio of 45%, 36%, 16% and 3% to produce the traditional Chinese medicine compound composition with anti-anxiety effect.

Described below are the common preparations of the traditional Chinese medicine compound composition provided herein when applied to the preparation of health-care food.

Embodiment 5

The *Paeoniae Radix Alba* extract, the *Gardeniae Fructus* extract, the *Albiziae Flos* extract and the *Moutan Cortex* extract prepared in Embodiment 2 were mixed uniformly and sieved with a sieve of 80 mesh to produce a traditional Chinese medicine compound composition. Then the composition was mixed uniformly with starch and magnesium stearate, pressed into tablets and film-coated to produce final tablets.

Embodiment 6

The liquid extracts prepared in Embodiment 2 were mixed uniformly, decocted to 1 g/mL and transferred to a beaker, to which sucrose, starch and dextrin were introduced and mixed uniformly to produce a mixture. When the mixture was kneaded into a dough and dispersed when touched, granules that can not pass through the 20-mesh sieve and 80-mesh sieve but can pass the 10-mesh sieve were collected and dried in an oven in time for use.

Finally, the collected granules were dried under vacuum to a water content of 4% to produce the traditional Chinese medicine compound granules.

Embodiment 7

The extracts prepared in Embodiment 2 were mixed uniformly and sieved with an 80-mesh sieve to produce a traditional Chinese medicine composition. Then the pre gelatinized starch, talcum powder and magnesium stearate were further mixed uniformly and encapsulated to obtain a traditional Chinese medicine compound capsule.

Further, the following tests were performed to evaluate the efficacy of the traditional Chinese medicine (TCM) compound composition prepared herein.

Efficacy Test

1. Grouping:

After the mice arrived, they were acclimatized for a week to enter the experiment. There were 12 mice in each group. Mice were divided into five groups according to the randomized block design: positive control group (Diazepam), normal control group, high dose TCM composition (prepared in Embodiment 5) group, low dose TCM composition (prepared in Embodiment 6) group, high dose TCM composition (prepared in Embodiment 6) group.

2. Administration

The normal group mice were gavaged with the same volume of purified water, and the gavage doses of other groups were illustrated in the results table section below. The mice were gavaged every morning at fixed time (9:00) with a gavage volume of 0.1 ml·10 $g^{-1}$. the administration lasted for one month, and behavioral assays were performed 1 h after the last gavage.

3. Test mode 3.1 Open Field Test

The test was performed inside an open field box with 50 cm long, 50 cm wide, and 50 cm deep. The bottom of the open field box was equally divided into nine squares, with the right middle area being the central area and the remaining area being the peripheral area. The bottom and surrounding of the open field box were all white. The test was performed in a quiet weak red light environment. At the beginning, the mice were placed in the center of the open field box, and the activity within 6 minutes was observed. Total running distance, running distance in central area and number of entries into central area of the mice were recorded.

3.2 EPM Test

EPM test system included two 35 cm×6 cm relative open arms and two 35 cm×6 cm relative closed arms. The upper parts of the closed arms were open, and the four sides of the open arm were open. There was a 5 cm×5 cm relative open part in the center between the open arm and the closed arm. The maze was 50 cm above the ground. The mice were placed in the central open area with the head facing the open arms. Supermaze software was used to record the times of mice entering open arms and closed arms and the time of staying at two arms in 5 minutes (with all limbs entering or leaving the arms as the standard). The percentage (proportion) of the number of mice entering the open arms in the total number (sum times of two arms) and the percentage (proportion) of the time of mice entering the open arms in the total time (sum residence time of two arms) were calculated.

3.3 Light-Dark Box Test

The light and dark box is composed of an integral box which is divided into two compartments (light area and dark area) of the same size (L×w×H=25 cm×25 cm×30 cm) by a middle gate (6.5 cm×6.5 cm). The light area is illuminated by white light, and the dark area is illuminated by red light. At the beginning of the test, each mouse was placed in the center of the light area facing the partition wall, and the middle gate was removed. Once four claws of one mouse entered the compartment, it was recorded as one entry. Supermaze software was used to record the distance in light area, retention time in light area and number of entries into light area in 5 minutes.

4. Test Result 4.1 Open Field Test

TABLE 1

| Group | Dosage (mg/kg) | Animal number |
|---|---|---|
| Control | / | 12 |
| Diazepam | 2 | 12 |
| High dose TCM composition (prepared in Embodiment 5) | 446.67 | 12 |
| Low dose TCM composition (prepared in Embodiment 6) | 446.67 | 12 |
| High dose TCM composition (prepared in Embodiment 6) | 223.33 | 12 |

TABLE 2

Effects of the drugs to be tested on the open field test

| Group | Animal number | Total running distance | Running distance in central area | Number of entries into central area |
|---|---|---|---|---|
| Control | 10 | 21307 ± 1269 | 1663 ± 136.4 | 9.200 ± 0.8273 |
| Diazepam | 9 | 29927 ± 2380** | 2168 ± 218.6* | 12.78 ± 1.498* |
| High dose TCM composition (prepared in Embodiment 5) | 8 | 27375 ± 2212* | 1829 ± 285.1 | 10.25 ± 1.623 |
| Low dose TCM composition (prepared in Embodiment 6) | 9 | 26503 ± 1713* | 2257 ± 302.5* | 13.33 ± 1.863* |
| High dose TCM composition (prepared in Embodiment 6) | 11 | 29352 ± 1101**** | 2311 ± 181.2** | 14.27 ± 1.532** |

Notes:
compared with the control group, *$p < 0.05$, $p < 0.01$, *$p < 0.001$.

According to the data in Table 2 above, one month after gavage administration, compared with that in the control group, the total running distance in the open field of the mice in each administration group was significantly increased; except for the high dose TCM composition (prepared in Embodiment 5) group, the running distance in central area in other administration groups was significantly increased compared with that in the control group; except for the high dose TCM composition (prepared in Embodiment 5) group, the entry number of central area in other administration groups was significantly increased compared with that in the control group. The results showed that the motor activity of the mice was significantly enhanced after administration. Except for the high dose TCM composition (prepared in Embodiment 5) group, the other drugs significantly enhanced the activity in the central area of mice and had better anti-anxiety activity. The low dose TCM composition (prepared in Embodiment 6) group, was the best, followed by the high dose TCM composition (prepared in Embodiment 6) and high dose TCM composition (prepared in Embodiment 5).

4.2 EPM Test

TABLE 3

Effects of the drugs to be tested on the EPM test

| Group | Animal number | OE % | OT % |
|---|---|---|---|
| Control | 9 | 0.2348 ± 0.01689 | 0.1260 ± 0.02201 |
| Diazepam | 9 | 0.3061 ± 0.02734* | 0.1981 ± 0.03287* |
| High dose TCM composition (prepared in Embodiment 5) | 8 | 0.3383 ± 0.02640** | 0.1919 ± 0.01960* |
| Low dose TCM composition (prepared in Embodiment 6) | 8 | 0.2915 ± 0.01682* | 0.1965 ± 0.02260* |
| High dose TCM composition (prepared in Embodiment 6) | 11 | 0.3386 ± 0.02554** | 0.1899 ± 0.02591* |

Notes:
compared with the control group, *$p < 0.05$, $p < 0.01$, *$p < 0.001$.

According to the data in Table 3 above, one month after gavage administration, compared with the control group, the percentage of OE % and OT % in each treatment group increased significantly. The results showed that all the drugs significantly enhanced the activity of mice in open arms and had good anti-anxiety activity.

4.3 Light-Dark Box Test

TABLE 4

Effects of the drugs to be tested on the light-dark box test

| Group | Animal number | Distance in light area | Retention time in light area | Number of entries into light area |
|---|---|---|---|---|
| Control | 10 | 13399 ± 665.3 | 131.7 ± 5.421 | 12.10 ± 1.027 |
| Diazepam | 12 | 18141 ± 1011*** | 152.1 ± 6.860* | 18.92 ± 1.540** |
| High dose TCM composition (prepared in Embodiment 5) | 8 | 16861 ± 907.1** | 147.5 ± 3.737* | 20.00 ± 1.535*** |
| Low dose TCM composition (prepared in Embodiment 6) | 11 | 15432 ± 695.8* | 139.8 ± 7.128 | 15.64 ± 1.146* |
| High dose TCM composition (prepared in Embodiment 6) | 9 | 15664 ± 928.9* | 150.8 ± 7.514* | 17.11 ± 1.670** |

Notes:
compared with the control group, *$p < 0.05$, $p < 0.01$, *$p < 0.001$.

According to the data in Table 3 above, one month after gavage administration, compared with the control group, the distance in light area of each administration group was significantly increased; the retention time in light area of the high dose TCM composition (prepared in Embodiment 5) group and low dose TCM composition (prepared in Embodiment 6) group was significantly prolonged; the number of entries into light area of each administration group was significantly increased. The results showed that all the drugs significantly enhanced the activity of mice in the light area and had anti-anxiety activity, and the high dose TCM composition (prepared in Embodiment 5) group and the low dose TCM composition (prepared in Embodiment 6) group had better effect.

The above description of the disclosed embodiments enables the skilled in the art to achieve or use the disclosure. Multiple modifications to these embodiments will be apparent to those skilled in the art, and the general principles defined herein may be achieved in other embodiments without departing from the spirit or scope of the disclosure. The present disclosure will therefore not be restricted to these embodiments shown herein, but rather to comply with the broadest scope consistent with the principles and novel features disclosed herein.

What is claimed is:

1. A traditional Chinese medicine composition with anti-anxiety effect, comprising:
   52.1% by weight of *Paeoniae Radix Alba* extract;
   27.0% by weight of *Gardeniae Fructus* extract;
   18.7% by weight of *Albiziae Flos* extract; and
   2.2% by weight of *Moutan Cortex* extract.

2. The traditional Chinese medicine composition of claim 1, wherein the *Paeoniae Radix Alba* extract, the *Gardeniae Fructus* extract, the *Albiziae Flos* extract and the *Moutan Cortex* extract are separately extracted from *Paeoniae Radix Alba*, *Gardeniae Fructus*, *Albiziae Flos* and *Moutan Cortex*; and the traditional Chinese medicine compound composition is prepared by compounding the *Paeoniae Radix Alba* extract, the *Gardeniae Fructus* extract, the *Albiziae Flos* extract and the *Moutan Cortex* extract.

3. A method for preparing the traditional Chinese medicine composition of claim 1, comprising:
   subjecting *Paeoniae Radix Alba*, *Gardeniae Fructus*, *Albiziae Flos* and *Moutan Cortex* to extraction, purification by microporous resin, concentration and drying to produce *Paeoniae Radix Alba* extract, *Gardeniae Fructus* extract, *Albiziae Flos* extract and *Moutan Cortex* extract, respectively; and
   mixing the *Paeoniae Radix Alba* extract, *Gardeniae Fructus* extract, *Albiziae Flos* extract and the *Moutan Cortex* extract uniformly to produce the traditional Chinese medicine composition;
   wherein the preparation method specifically comprises:
   (1) subjecting *Paeoniae Radix Alba*, *Gardeniae Fructus*, *Albiziae Flos* and *Moutan Cortex* to extraction respectively with an ethanol solution/purified water under refluxing and filtration; subjecting a residue to extraction with a solvent and filtration several times; and combining filtrates to obtain a crude *Paeoniae Radix Alba* extract, a crude *Gardeniae Fructus* extract, a crude *Albiziae Flos* extract and a crude *Moutan Cortex* extract, respectively;
   (2) subjecting the crude *Paeoniae Radix Alba* extract, the crude *Gardeniae Fructus* extract, the crude *Albiziae Flos* extract and the crude *Moutan Cortex* extract to purification, concentration, drying and sieving to produce the *Paeoniae Radix Alba* extract, *Gardeniae Fructus* extract, *Albiziae Flos* extract and the *Moutan Cortex* extract; and
   (3) mixing the *Paeoniae Radix Alba* extract, *Gardeniae Fructus* extract, *Albiziae Flos* extract and *Moutan Cortex* extract uniformly to produce the traditional Chinese medicine composition.

4. The preparation method of claim 3, wherein in step (1), a volume ratio of *Paeoniae Radix Alba* to the ethanol solution/purified water is 1:(5-20); a volume ratio of *Gardeniae Fructus* to the ethanol solution/purified water is 1:(5-20); a volume ratio of *Albiziae Flos* to the ethanol solution/purified water is 1:(5-20); a volume ratio of *Moutan Cortex* to the ethanol solution/purified water is 1:(5-20); and the extraction of *Paeoniae Radix Alba*, *Gardeniae Fructus*, *Albiziae Flos* and *Moutan Cortex* is performed 1-3 times each for 1-3 h, respectively.

5. The preparation method of claim 3, wherein a volume ratio of the solvent to the residue is (6-8):1; and the extraction of the residue is performed under refluxing 0-3 times each for 1-2 h.

6. The preparation method of claim 3, wherein in step (2), the drying is performed at 50-100° C.; and the sieving is performed using a sieve of 60-80 mesh.

7. A health care food comprising the traditional Chinese medicine composition of claim 1.

8. A dietary supplement comprising the traditional Chinese medicine composition of claim 1 in the form of a capsule, a granule or a tablet.

* * * * *